United States Patent Office 3,379,933
Patented Apr. 23, 1968

3,379,933
ELECTRICAL PROTECTIVE RELAYS
Hans Hoel, Oslo, Norway, assignor to The English Electric Company Limited, London, England, a British company
Filed Dec. 21, 1964, Ser. No. 419,840
Claims priority, application Great Britain, Jan. 1, 1964, 35/64
5 Claims. (Cl. 317—36)

The invention relates to electrical protective relays.

According to the invention such a relay has a directional element responsive to a first signal dependent on the voltage and to a second signal dependent on the current in a section of an electrical system to be protected by the relay, the directional element producing a first output signal on the occurrence of a fault whose effective impedance lies within a predetermined forward-looking range representing at least the distance of the said section, a non-directional element responsive to the said first and second signals for producing a second output signal on the occurrence of a fault whose effective impedance lies within a predetermined major part of the said forward-looking range or within a predetermined backward-looking range, and circuit means for receiving the first and second output signal and for producing in response thereto a fault indicating signal.

According to a feature of the invention the circuit means may be arranged to produce the fault indicating signal without delay whenever the first and second output signals are present simultaneously thereby enabling a "Zone ONE" protection.

According to another feature of the invention the circuit means may include timing means effective in response to the first output signal to adjust the non-directional element, after a predetermined time interval, to extend the said predetermined major part in a forward direction and thereby enable a "Zone TWO" protection for faults whose effective impedance lies within the so-extended major part.

Alternatively, the circuit means may include timing means effective in response to the first output signal to produce the fault indicating signal after a predetermined time interval and thereby enable a "Zone TWO" protection for faults whose effective impedance is within the said predetermined forward-looking range.

According to another feature of the invention the circuit means may include sending means and receiving means effective to send and receive respectively supervisory signals influencing the operation of the relay and an adjacent relay disposed at the remote end of the section so that both relays will initiate the opening of associated circuit breakers without delay for electrical faults near either end of the section.

One electrical protective relay according to the present invention will now be described by way of example and with reference to the accompanying drawings in which.

Figure 1:
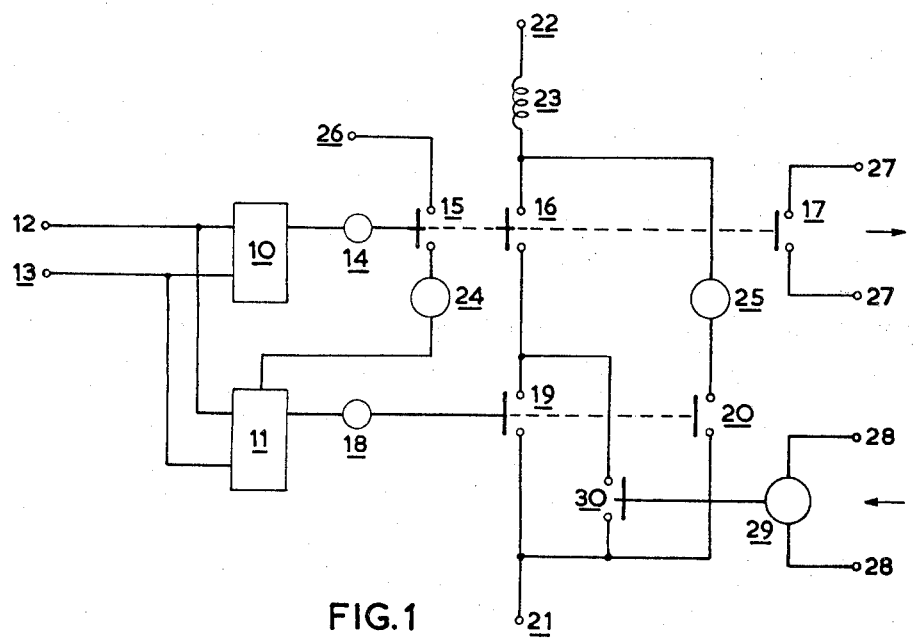
FIG. 1 shows diagrammatically the electrical circuit connections of the relay.

Referring now to the drawings a directional element 10 and a non-directional element 11 are connected to input terminals 12 and 13 which respectively provide signals dependent on the current and voltage of an electrical system to be protected by the relay. In response to a first output signal from element 10 an electromagnet 14 is arranged to close contacts 15, 16 and 17 simultaneously. Similarly, in response to a second output signal from element 11 an electromagnet 18 is arranged to close contacts 19 and 20 simultaneously. Terminals 21 and 22 are connected across an external electrical supply so that whenever an electrical path exists between these terminals a current, a fault indicating signal, flows through a coil 23 which on energisation causes a circuit breaker associated with the relay in the electrical system to be protected to be tripped. Timing devices 24 and 25 are arranged to introduce predetermined time delays into the relay operation in accordance with the "zone" of protection covered, the supply for the device 24 being completed from a terminal 26 upon closure of contacts 15 and the supply for the device 25 being completed upon closure of the contacts 20.

Terminals 27 are arranged to send a signal to an adjacent relay whenever the contacts 17 are closed. In response of a similar signal from the adjacent relay applied to terminals 28 an electromagnet 29 is arranged to close a contact 30.

Figure 2:
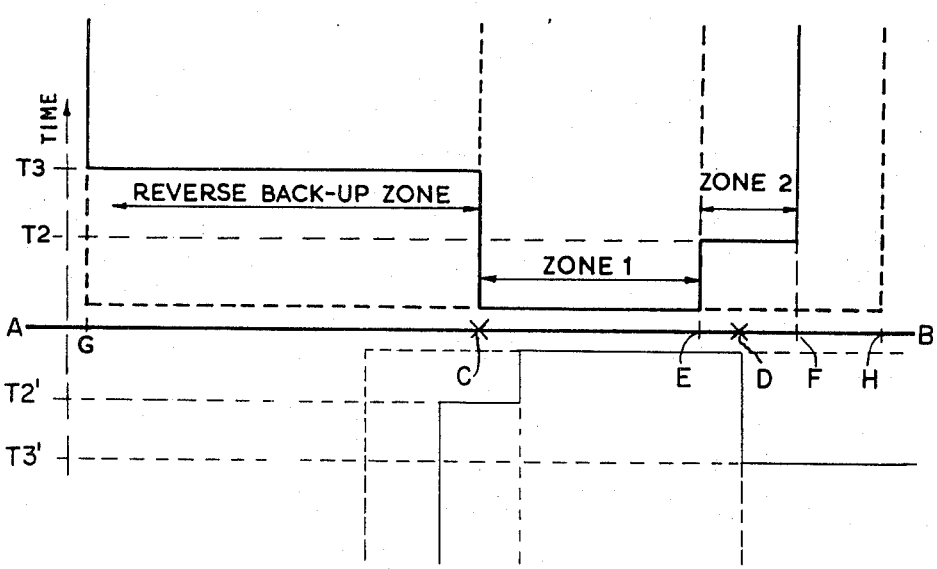
FIG. 2 shows diagrammatically the distance protection scheme provided by the relay.

In FIG. 2, AB represents part of an electrical system with circuit breakers at C and D, the above mentioned relay and adjacent relay being respectively at C and D. zone ONE of the relay at C is represented by CE, zone TWO is represented by EF, and the reverse back-up zone is represented by CG. Similar zones are shown beneath AB for the adjacent relay at D. Considering only the relay at C, faults occurring within zone TWO will not cause the relay to operate until after a time delay represented by T2 and determined by timing device 24, which extends the range of element 11, and faults occurring in the reverse back-up zone will not cause the relay to operate until after a time delay represented by T3 and determined by timing device 25. The forward-looking range of the element 10 is represented by CH the initial range of the element 11 is represented by GE and the extended range of this element is represented by GF. Similar considerations pertain to the relay at D, the relevant times being indicated by T2' and T3'.

Figure 3:
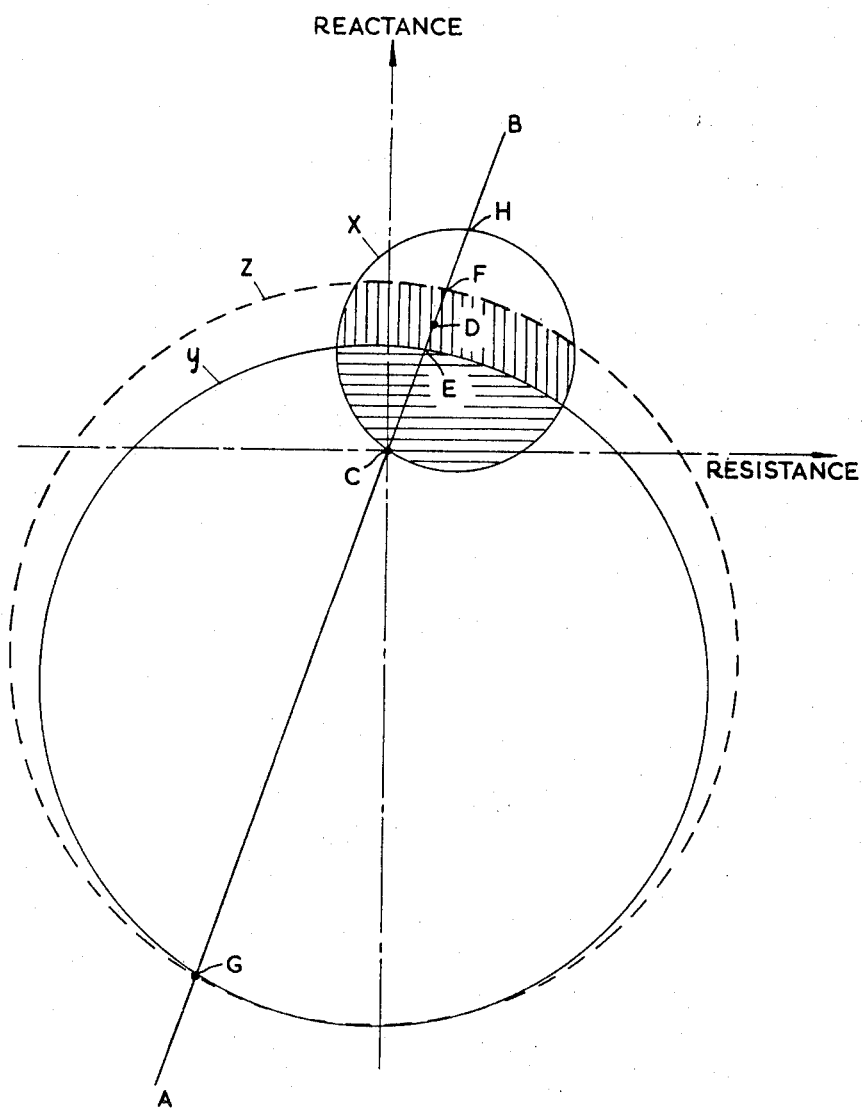
FIG. 3 shows graphically the characteristic of the relay.

In FIG. 3 the circle X represents on an impedance diagram the characteristic of element 10 and the circles Y and Z represent the initial and extended characteristics of element 11 respectively. Zone ONE and zone TWO are represented respectively by areas of horizontal and vertical hatching. Assume initially that a fault is present in zone ONE, that is, between the positions C and E in FIGURE 2. In this instance both elements 10 and 11 will respond and close their contacts 15–17 and 19, 20. The coil 23 is thus connected directly across the supply source and trips the circuit breaker.

Assume now that a fault is present between positions E and F, that is, in zone TWO. In this instance the element 10 will respond and close its contacts 15–17. Closure of contacts 15 will initiate operation of the timer 24 and if, at the expiration of time T2, the fault has not been isolated by the adjacent relay, the element 11 will operate to close its contacts 19 and 20 and energise the trip coil 23. In addition. should the fault lie between E and D, that is, in zone ONE of the relay at D, then the electromagnet 29 of the relay at C will be energised by the carrier signal so as to close contacts 30 which will also complete a circuit for the trip coil 23. If the carrier system is functioning correctly, contacts 30 will close before contacts 19, 20 so that any fault lying between the relays at C and D will be isolated in zone ONE time.

With a fault occurring at the "rear" of the relay C between the positions C and G only the element 11 will be operated and accordingly only contacts 19, 20 will close. Closure of contacts 20 initiates operation of the timer 25 and at the expiration of time T3 the trip coil 23 will be energised. It should be borne in mind however, that such a fault occurring within C and G will fall within one of the zones covered by the corresponding directional element 10 in the other relay at C (not shown) "looking" towards G, or even the relay at D, and accordingly this fault would normally be cleared before the time T3, operation at this time only being effective as "back-up" protection.

The invention thus provides with only two elements 10 and 11, two forward tripping zones and one reverse back-up zone which together provide adequate safeguards should an adjacent relay in the system malfunction, and in addition incorporates a carrier signalling system whereby all inter-relay faults may be isolated in the shortest time (zone ONE time).

Although, the relay circuit has been described with reference signals being transmitted to the adjacent relay using carrier signalling, a radio link, a pilot wire or any other means of transferring signals between relays may alternatively be employed.

Furthermore, the circuit may be modified so that in response to a signal from the element 11 a blocking signal may be sent to the adjacent relay which will in effect prevent a tripping operation of the adjacent relay. However in response to the output signal of the element 10 this blocking signal is cancelled. In this way for faults occurring between C and G which are also within the reach of a directional element of the adjacent relay the circuit breaker at D may be prevented from tripping unnecessarily by the blocking signal from the relay at C.

In a further modification, all the contacts may be replaced by electronic interconnections or a combination of electronic interconnections and contacts such as by using transistors or other semi-conductor switching devices.

In a further modification, the relay may be arranged to act with several relays in a comprehensive protection scheme or may alternatively act independently of any other relay.

It will be appreciated from the above description that the relay includes a directional element and a non-directional element both responsive to input signals dependent on the current and the voltage of an electrical system to be protected by the relay, and that these two elements act together in such a way that the relay behaves in a manner similar to, as used at the present time, a relay having three separate impedance detecting elements for providing respectively zone ONE protection, reverse back-up protection and an over-reaching forward zone suitable for carrier or similar protection.

The relay described has an advantage over a relay having separate elements in that the relay exhibits better arc fault characteristics for zone ONE and zone TWO, the characteristics being substantially horizontal (as seen in FIG. 3) for faults on the border of these zones away from the relay.

What I claim as my invention and desire to secure by Letters Patent is:

1. A protective relay arrangement for protecting an electrical system, comprising
    first and second electrical relays spaced apart from one another within said system, said first relay comprising
    two elements for receiving an input signal indicative of conditions in said electrical system, one said element being operable to develop an output signal upon the input being indicative of a fault occurring within a first distance extending unidirectionally from said first relay and overlapping a section of said system extending between the first and second relays, the other element being operable to develop an output signal upon the input being indicative of a fault occurring within a second distance consisting of a first zone embracing a first part of the first distance within said section and another zone extending in the opposite direction from the relay, and
    control means connected to said two elements and operable instantaneously to effect a protective function in response to both output signal occurring together, whereby to protect the system from faults occurring within said first zone, and operable at predetermined instants following an output signal from either one of said first and second elements only whereby to protect the system from faults occurring within a second zone of said first distance and said other zone extending in the opposite direction, respectively, said second zone being contiguous with the first zone and overlapping said section.

2. A protective relay arrangement according to claim 1, wherein said control means comprises
    a first timer operable in response to an output signal from said first element to cause said second element to produce an output signal at one of said predetermined instants whereby said control means protects the system from faults occurring in said second zone, and
    a second timer responsive to an output signal from said second element to effect operation of said control means at another of said predetermined instants, later than said one instant, to protect the system from faults occuring in said other zone.

3. A protective relay arrangement according to claim 2, comprising
    transmitter means for transmitting a supervisory signal to said second relay in response to an output from said one element of the first relay.

4. A protective relay arrangement according to claim 3, wherein said first and second relays are identical but have their first distances extending in opposite directions to one another, each relay including
    receiver means for receiving said supervisory signal from the other relay in response to an output from said transmitter means at that relay, the control means at each relay being operable in response to both an output from its said one element and said supervisory signal whereby to protect the system from faults occurring anywhere within said section before the said one predetermined instant.

5. A relay arrangement for protecting an electrical system from effects of electrical faults, comprising
    first and second distance relays spaced apart from one another at opposite ends of a predetermined section of said system, each relay comprising
    two elements for receiving an input signal indicative of conditions in said system, one element being operable to develop an output signal upon the input being indicative of a fault occurring within a first distance extending unidirectionally from that relay beyond the said section, the other element being operable to develop an output signal upon the input being indicative of a fault occurring within a second distance consisting of a first zone within said section embracing a first part of the first distance and other zone extending in the opposite direction from that relay, and
    control means connected to the said two elements, said control means including
    switching means operable instantaneously to effect a protective function in response to both output signals occurring together whereby to protect the system from faults occurring within said first zone, and
    timing means controlling said switching means and operable at one predetermined instant following an output signal from said first element only whereby to protect the system from faults occurring within a second zone of said first distance which is contiguous with the first zone and extends beyond said section, and operable at another, later, predetermined instant following an output signal from said second element only whereby to protect the system from faults occurring within said other zone extending in the opposite direction from the relay, the first distances of said first and second relays being the same as one another but extending in opposite directions.

References Cited

UNITED STATES PATENTS

| | | | |
|---|---|---|---|
| 2,897,406 | 7/1959 | Lensner et al. | 317—36 X |
| 3,201,651 | 8/1965 | Calhoun | 317—36 |

MILTON O. HIRSHFIELD, *Primary Examiner.*

J. D. TRAMMELL, *Assistant Examiner.*